US010178306B2

(12) United States Patent
Ramprasad et al.

(10) Patent No.: US 10,178,306 B2
(45) Date of Patent: Jan. 8, 2019

(54) WIRELESS DEVICE HAVING DEDICATED REAR PANEL CONTROL

(71) Applicant: TracFone Wireless, Inc., Miami, FL (US)

(72) Inventors: Satish Ramprasad, Miami, FL (US); Sergio Rivera, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 15/625,056

(22) Filed: Jun. 16, 2017

(65) Prior Publication Data

US 2017/0366718 A1 Dec. 21, 2017

Related U.S. Application Data

(60) Provisional application No. 62/350,977, filed on Jun. 16, 2016.

(51) Int. Cl.
*H04N 1/00* (2006.01)
*H04N 5/225* (2006.01)
*H04N 5/232* (2006.01)
*G06F 3/02* (2006.01)
*G06F 3/0488* (2013.01)

(52) U.S. Cl.
CPC .......... *H04N 5/23225* (2013.01); *G06F 3/02* (2013.01); *H04N 1/00387* (2013.01); *H04N 1/00389* (2013.01); *H04N 5/2252* (2013.01); *H04N 5/232* (2013.01); *H04N 5/23216* (2013.01); *G06F 3/0488* (2013.01)

(58) Field of Classification Search
CPC ........... H04N 1/00384; H04N 1/00387; H04N 1/00389; H04N 5/2251; H04N 5/2252; H04N 5/23225

See application file for complete search history.

(56) References Cited

U.S. PATENT DOCUMENTS 6,415,165 B1 *  7/2002  Ishigami  ............... G06F 1/1616
                                                    345/173
6,681,124 B2 *  1/2004  Prior  .................... H04M 1/0281
                                                    455/563

(Continued)

OTHER PUBLICATIONS

Sprint Printable User Guide for the LG G3—copyright 2015.*

(Continued)

*Primary Examiner* — Daniel M Pasiewicz
(74) *Attorney, Agent, or Firm* — Baker & Hostetler LLP

(57) ABSTRACT

An electronic device includes a housing including a front panel and a rear panel, the rear panel arranged on a side of the housing opposite the front panel, the housing further including side edges connecting the rear panel to the front panel. The electronic device further includes, a processor configured to execute instructions and the processor being arranged within the housing, a display device configured to generate an interface based in part in response to the processor, wherein the display device is arranged in the front panel, a touchscreen associated with the display device and configured to sense a user input, wherein the user input is provided to the processor and wherein the touchscreen comprises part of the front panel, and a rear input arranged on the rear panel of the housing and configured to provide a dedicated input to the processor.

20 Claims, 7 Drawing Sheets

(56) References Cited

U.S. PATENT DOCUMENTS

| | | | |
|---|---|---|---|
| 7,765,495 B2* | 7/2010 | Choi | G06F 1/1626 345/184 |
| 2001/0041598 A1* | 11/2001 | Yoshino | G06F 1/1626 455/566 |
| 2004/0116167 A1* | 6/2004 | Okuzako | H04M 1/0214 455/575.3 |
| 2009/0201260 A1* | 8/2009 | Lee | G06F 3/04883 345/173 |
| 2013/0069883 A1* | 3/2013 | Oga | G06F 1/1615 345/172 |

OTHER PUBLICATIONS

How to Use the LG G3 Buttons as a Cam Shortcut by Cory Gunther Aug. 16, 2014. GottaBe Mobile https://www.gottabemobile.com/how-to-use-the-lg-g3-buttons-as-a-camera-shortcut/.*
20 great tips to help you get the most out of your LG G3 by Simon Hill Aug. 2, 2014. Android Army https://www.digitaltrends.com/mobile/lg-g3-helpful-tips-and-tricks/.*
User Guide LG G2—copyright 2013.*

* cited by examiner

WIRELESS DEVICE HAVING DEDICATED REAR PANEL CONTROL

CROSS REFERENCE TO PRIOR APPLICATIONS

This application claims the benefit from U.S. Provisional Application No. 62/350,977 filed on Jun. 16, 2016, which is hereby incorporated by reference in its entirety for all purposes as if fully set forth herein.

BACKGROUND OF THE DISCLOSURE

1. Field of the Disclosure

This disclosure relates generally to a wireless device and process to provide a dedicated rear panel control. More particularly, the disclosure relates generally to a wireless device and process to provide a dedicated rear panel control arranged on a rear panel of the wireless device.

2. Related Art

Many electronic devices have touch-based graphical user interfaces. These electronic devices can include wireless devices, mobile phones, tablet computers, gaming devices, MP3 players, and the like. Additionally, many electronic devices have other types of input devices such as buttons and the like. These electronic devices have the touch-based graphical user interface and/or input devices arranged on the front panel or sides. In this regard, users often desire to operate the electronic device using a single hand. However, the fingers of the user's hand are typically preoccupied with grasping and holding the electronic device in a secure manner thus preventing easy selection, input, execution and other interaction with the front panel of the electronic device. Likewise, there are some physically impaired individuals that may not have full use of both hands thus preventing easy selection, input, execution and other interaction with the electronic device while holding the same.

Accordingly, there is a need for a wireless device and process that provides a user with the ability to provide easier input, execution and other interaction with the wireless device by a user while the user is holding the wireless device with one hand.

SUMMARY OF THE DISCLOSURE

The foregoing needs are met, to a great extent, by the disclosure, with a process and device for implementing a wireless device and process to provide a dedicated control input arranged on the rear panel of the wireless device.

In one or more aspects, an electronic device includes a housing including a front panel and a rear panel, the rear panel arranged on a side of the housing opposite the front panel, the housing further including side edges connecting the rear panel to the front panel, a processor configured to execute instructions and the processor being arranged within the housing, a display device configured to generate an interface based in part in response to the processor, wherein the display device is arranged in the front panel, a touchscreen associated with the display device and configured to sense a user input, wherein the user input is provided to the processor and wherein the touchscreen comprises part of the front panel, and a rear input arranged on the rear panel of the housing and configured to provide a dedicated input to the processor.

In a further aspect, a process of implementing an electronic device includes providing a housing including a front panel and a rear panel, the rear panel arranged on a side of the housing opposite the front panel, the housing further including side edges connecting the rear panel to the front panel, arranging a processor within the housing, a processor configured to execute instructions, arranging a display device in the front panel, the display device configured to generate an interface based in part in response to the processor, arranging a touchscreen as part of the front panel, the touchscreen associated with the display device and configured to sense a user input, wherein the user input is provided to the processor, and arranging a rear input on the rear panel of the housing, the rear input configured to provide a dedicated input to the processor.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Reference in this specification to a wireless device is intended to encompass devices such as smartphones, mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Wireless devices may connect to a "wireless network" or "network" and are intended to encompass any type of wireless network to obtain mobile phone services through the use of a wireless device, such as the Global System for Mobile Communication (GSM) network, Code-Division Multiple Access (CDMA) network GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, a communication channel as defined herein, or the like, and/or a combination of two or more thereof, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
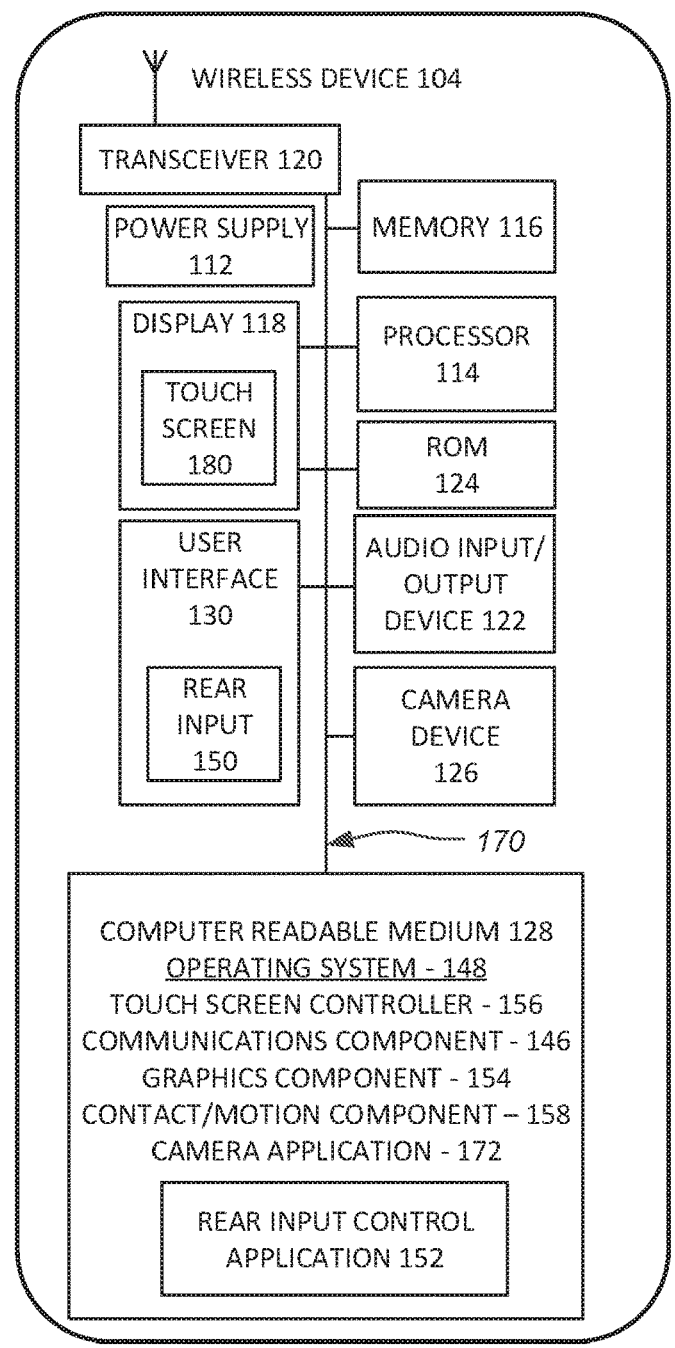
FIG. 1 shows a schematic of an exemplary wireless device in accordance with aspects of the disclosure.

FIG. 1 shows a schematic of an exemplary wireless device in accordance with aspects of the disclosure. The wireless device 104 includes a processor 114, a memory 116, a display 118, a user interface 130, and the like. The processor 114 may be a central processing unit, microprocessor, dedicated hardware, or the like configured to execute instructions including instructions related to software programs. The display 118 may be a liquid crystal display having a backlight to illuminate the various color liquid crystals to provide a colorful display. The user interface 130 may be any type of physical input having one or more buttons, switches, and the like and/or may be implemented as a touchscreen 180.

The wireless device 104 may further include in the memory 116 or separate from the memory 116, a computer readable memory 128, an operating system 148, a communication component 146, a contact/motion component 158, a touchscreen controller 156, a graphics component 154, and the like. The operating system 148 together with the various components providing software functionality for each of the components of the wireless device 104. The wireless device 104 may further include a read-only memory 124 (ROM) and a power supply 112 such as a battery.

The memory 116 may include a high-speed random-access memory. Also, the memory 116 may be a non-volatile memory, such as magnetic fixed disk storage, flash memory or the like. The various components of the wireless device 104 may be connected through various communication lines including a data bus 170.

Additionally, the wireless device 104 may include an audio input/output device 122. The audio input/output device 122 may include speakers, speaker outputs, and in the like, providing sound output; and may include microphones, microphone inputs, and the like, for receiving sound inputs. The audio input/output device 122 may include an analog to digital converter and a digital to audio converter for audio input and output functions respectively.

When implemented as a smart phone, the wireless device 104 may include a transceiver 120 and the like. The wireless device 104 may provide radio and signal processing as needed to access a network for services over a communication channel as defined herein. The processor 114 may be configured to process call functions, data transfer, and the like and provide other services to the user.

The touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus.

In operation, the display 118 may display various objects associated with applications for execution by the processor 114. In this regard, a user may touch the display 118, and in particular the touchscreen 180, to interact with the objects. For example touching an object may execute an application in the processor 114 associated with the object that is stored in memory 116. Additionally or alternatively, touching an object may open a menu of options to be selected by the user. The display 118 may include a plurality of the objects for the user to interact with. Moreover the display 118 may include a plurality of screens. The display 118 showing one screen at a time. The user may interact with the display 118 to move a screen into view on the display 118. Various objects may be located in the each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

Figure 2:
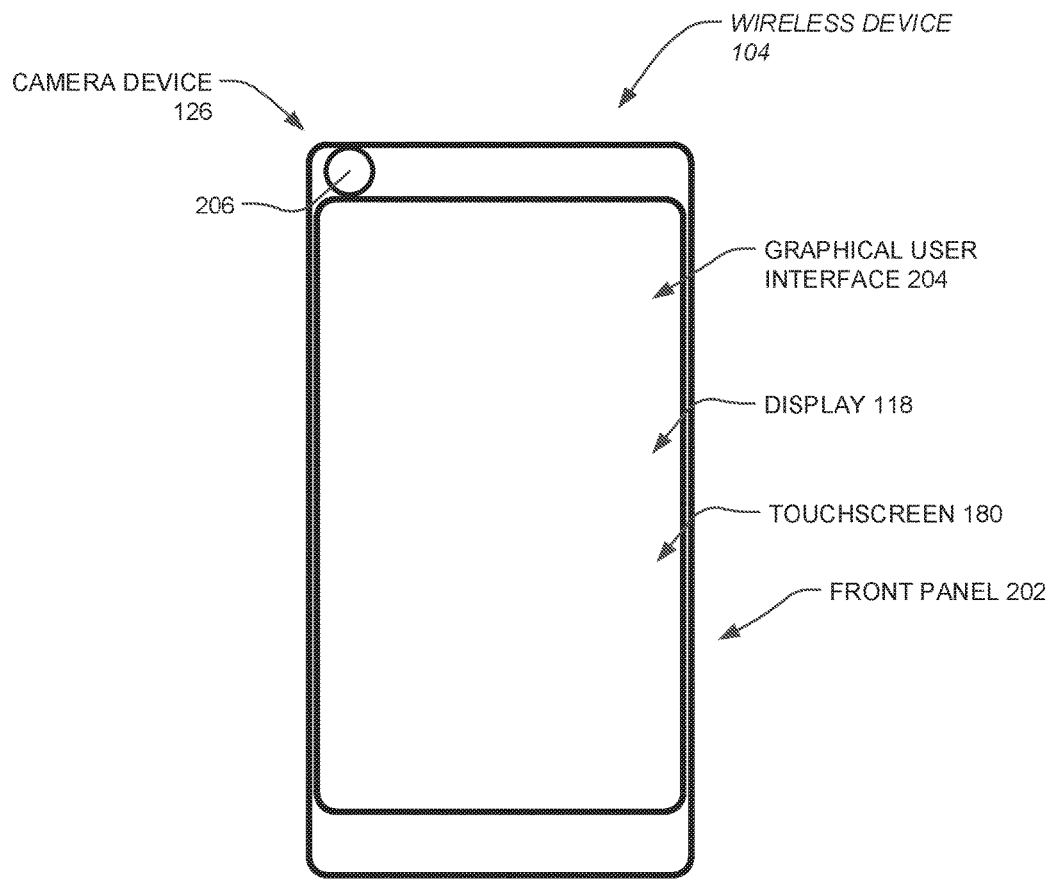
FIG. 2 shows a front panel of the wireless device in accordance with aspects of the disclosure.

The wireless device 104 may include a camera device 126. The camera device 126 can include one or more cameras to provide visual input. The wireless device 104 can include, for example, one camera device 126 on the back side of the wireless device 104 and another camera device 126 on the front side of the wireless device 104. The camera device 126 can also capture video in combination with a microphone of the audio input/output device 122. The camera device 126 may include a charge coupled device (CCD), CMOS image sensors, Back Side Illuminated CMOS, or the like. Images captured by the camera device 126 may be converted and stored in various formats including a JPEG file format, RAW feature format such as the Android (operating system) 5.0 Lollipop, and the like. The camera device 126 may include a lens 206 as shown in FIG. 2. The camera device 126 may operate in conjunction with a camera application 172. The camera application 172 may be stored in the memory 116, the computer readable memory 128, or the like. The camera application 172 may provide full functionality for the camera device 126 to capture images, convert images into a desired format, and store the images in the memory 116, the computer readable memory 128, or the like.

The wireless device may include rear input 150. The rear input 150 may be a button, switch, touch sensitive area, or the like. In one aspect the rear input may be a button. In one aspect the rear input may be a button that is recessed into the rear panel 302 to limit inadvertent pressing. In one aspect, the rear input 150 may operate in conjunction with a rear input control application 152. In one aspect, the rear input 150 may operate in conjunction with the user interface 130. In one aspect, the rear input 150 may be implemented as a button that is responsive to a single click, a double-click, a triple click, an extended hold or pressing and/or the like. In one aspect, the rear input 150 may be associated with a particular application stored on the wireless device 104 and implemented in conjunction with the rear input control application 152 as described in further detail below. The particular application may be the camera device 126 and the associated camera application, a music application configured to provide music over the audio input/output device 122, a phone call answering function associated with the wireless device 104, a social media application, a payment application, contact manager application, calendar and appointment organizer application, calculator application, map application, Wi-Fi connection application, privacy and security setting application, ringtones, wallpaper image and other important setup information, games and entertainment application, travel aid application, global positioning application, car application, taxi cab application, personal finance application, market information application, text message application, health and fitness application, personal trainer application for weight training, running and other exercise activities, and the like. In one aspect, the particular application may be the camera device 126 and the associated camera application.

FIG. 2 shows a front panel of the wireless device in accordance with aspects of the disclosure. In particular, FIG. 2 shows a front panel 202 of the wireless device 104. The front panel 202 may include the display 118 and a graphical user interface 204 that may implement the touchscreen 180. The front panel 202 may further include the camera device 126 and the lens 206. In one aspect, the front panel 202 may be a generally flat surface.

Figure 3:
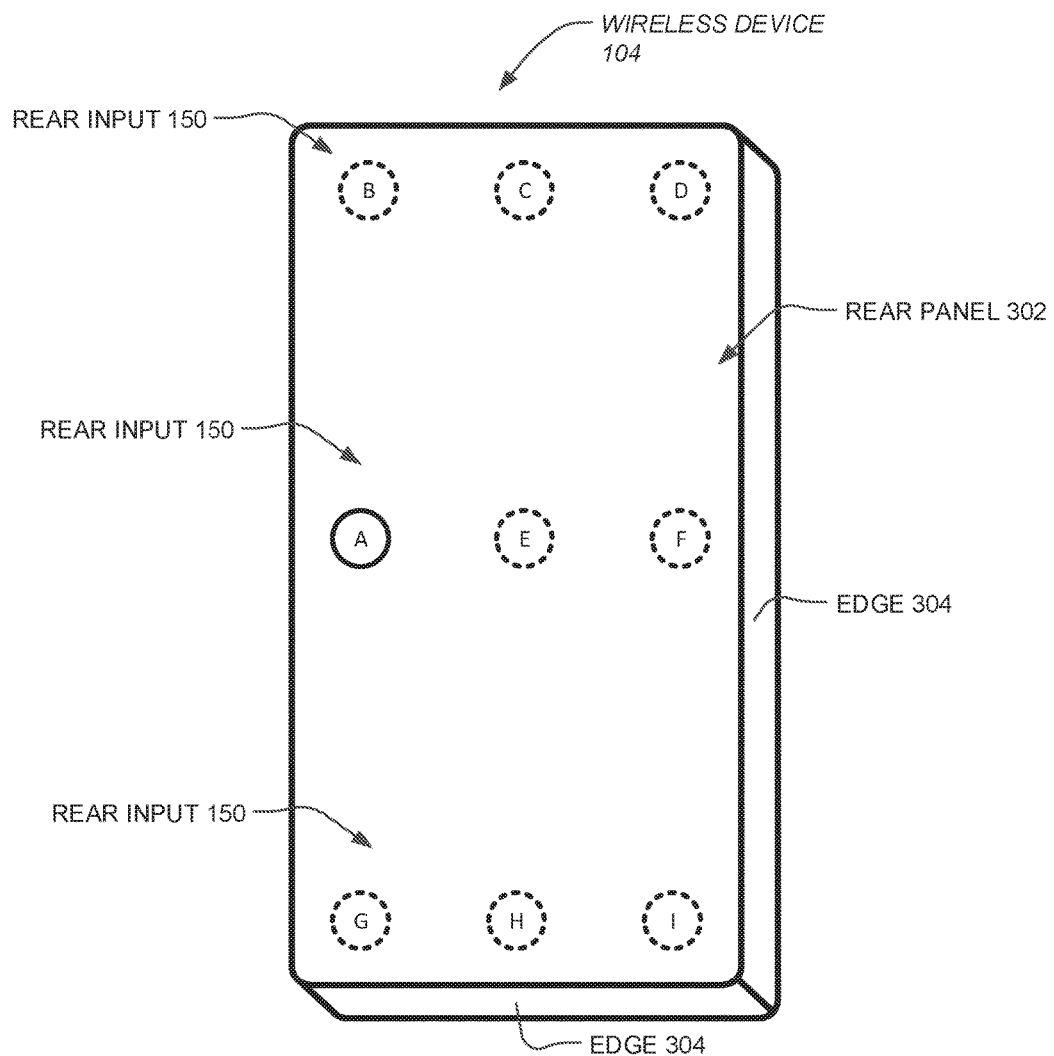
FIG. 3 shows a rear panel of the wireless device in accordance with aspects of the disclosure.

FIG. 3 shows a rear panel of the wireless device in accordance with aspects of the disclosure. In particular, FIG. 3 shows the rear panel 302 of the wireless device 104. In one aspect the rear panel 302 may be a generally flat surface. In one aspect the front panel 202, the rear panel 302, and edges 304 of the wireless device 104 form a housing. The edges 304 extending between the front panel 202 and the rear panel 302. Arranged on the rear panel 302 may be the rear input 150. In one aspect, the rear input 150 may be positioned on the left central side of the rear panel 302 as indicated by reference A. In one aspect, the rear input 150 may be positioned on the left upper side of the rear panel 302 as indicated by reference B. In one aspect, the rear input 150 may be positioned on the upper center side of the rear panel 302 as indicated by reference C. In one aspect, the rear input 150 may be positioned on the right upper side of the rear panel 302 as indicated by reference D. In one aspect, the rear input 150 may be positioned on the center of the rear panel 302 as indicated by reference E. In one aspect, the rear input 150 may be positioned on the right central side of the rear panel 302 as indicated by reference F. In one aspect, the rear input 150 may be positioned on the left lower side of the rear panel 302 as indicated by reference G. In one aspect, the rear input 150 may be positioned on the center lower side of the rear panel 302 as indicated by reference H. In one aspect, the rear input 150 may be positioned on the right lower side of the rear panel 302 as indicated by reference I. In one aspect, the rear input 150 may be positioned somewhere on the rear panel 302 between one or more of input locations A-I.

Figure 4:
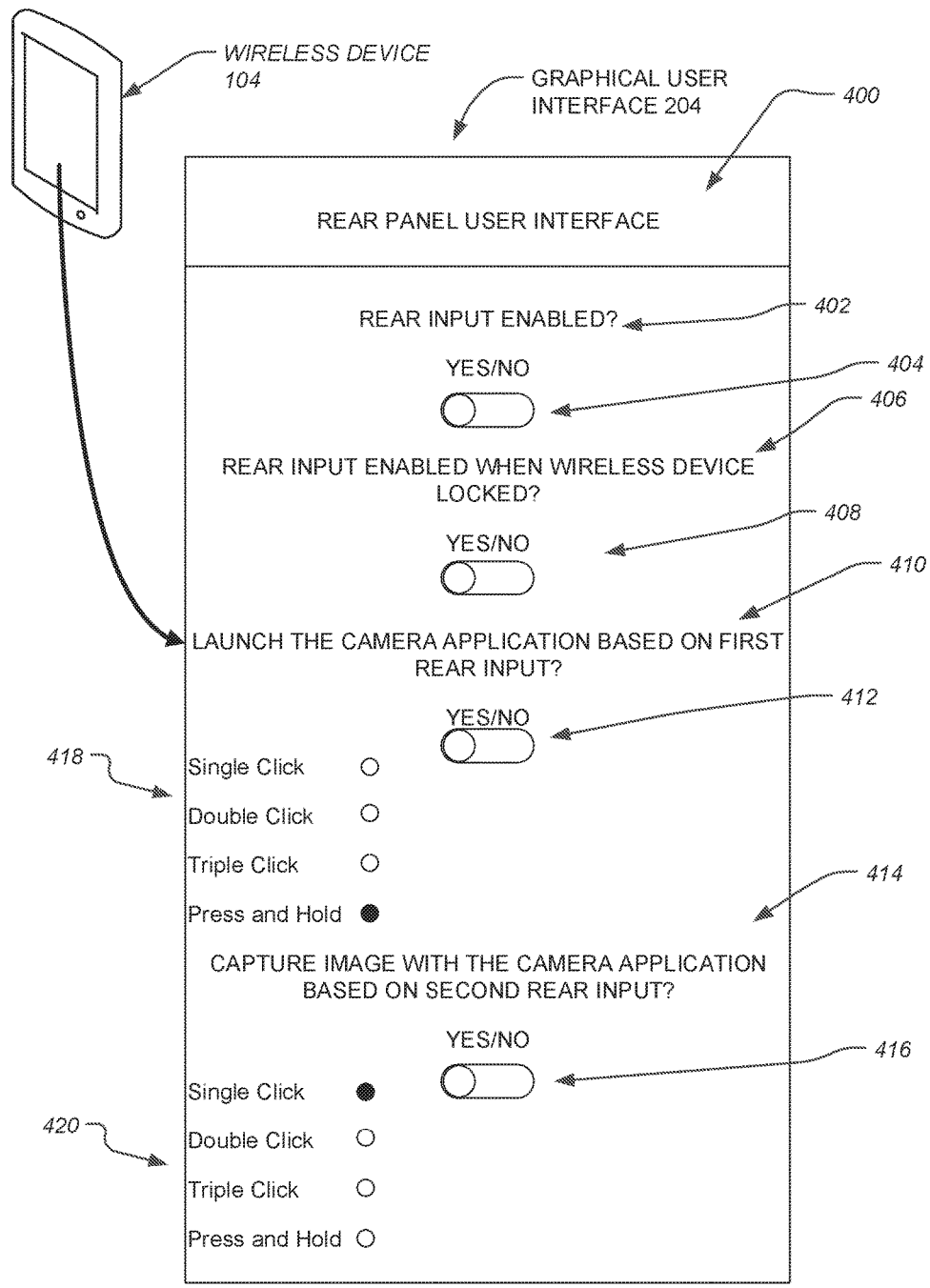
FIG. 4 shows a graphical user interface of the wireless device in accordance with aspects of the disclosure.

FIG. 4 shows a graphical user interface in accordance with aspects of the disclosure. In particular, FIG. 4 shows a rear panel user interface 400 that may be displayed as part of the graphical user interface 204 on the display 118. The rear panel user interface 400 may be implemented in conjunction with the touchscreen 180 to provide interaction and input from a user to customize the rear input 150 as desired by the user.

The rear panel user interface 400 may include enablement functionality 402. A user may then interact with and input using the touchscreen 180 in order to enable the rear input 150 or not. An input part 404 may control the enablement functionality 402 and may be a radio button, a virtual slide switch, or the like. In this regard, when the user enables the rear input 150, thereafter, interacting with the rear input 150 may provide some level of functionality as described herein. As shown in FIG. 4, the enablement functionality 402 has been enabled (YES).

The rear panel user interface 400 may include a locked wireless device enablement functionality 406. A user may then interact with and input using the touchscreen 180 in order to enable the rear input 150 or not when the wireless device is locked. An input part 408 may control the locked wireless device enablement functionality 406 and may be a radio button, a virtual slide switch, or the like. In this regard, the user may wish to avoid operation of the rear input 150 when the wireless device 104 is locked. In this case, the user may disable the locked wireless device enablement functionality 406. On the other hand, a user may desire to be able to operate the rear input 150 even when the wireless device 104 is locked. In this case, the user may enable the locked wireless device enablement functionality 406 for the rear input 150. As shown in FIG. 4, the locked wireless device enablement functionality 406 has been enabled (YES). Accordingly, aspects of the rear input 150 may be implemented when the wireless device 104 is locked.

The rear panel user interface 400 may include camera launch functionality 410. A user may then interact with and input using the touchscreen 180 in order to enable the rear input 150 or not. An input part 412 may control the camera launch functionality 410 and may be a radio button, a virtual slide switch, or the like. Once the user has enabled the camera launch functionality 410, thereafter pressing the rear input 150 may launch the camera application and the camera will be ready to capture an image. As shown in FIG. 4, the camera launch functionality 410 has been enabled (YES). In further aspects, other applications may be launched based on the rear input 150 including a music application configured to provide music over the audio input/output device 122, a phone call answering function associated with the wireless device 104, a social media application, a payment application and the like as described herein.

The camera launch functionality 410 may be further customized to launch the camera device 126 based on a single click, a double-click, a triple click, a press and hold or similar interaction with the rear input 150. In this regard, the rear panel user interface 400 may include an input section 418 to designate the type of interaction. The input section 418 may be a radio button, a virtual slide switch, or the like. As shown in FIG. 4, the input section 418 has been set for a press and hold functionality for the rear input 150.

The rear panel user interface 400 may include camera image capture functionality 414. A user may then interact with and input using the touchscreen 180 in order to enable the rear input 150 or not. An input part 416 may control the camera image capture functionality 414 and may be a radio button, a virtual slide switch, or the like. Once the user has enabled the camera image capture functionality 414, thereafter pressing the rear input 150 may operate the camera to capture an image. As shown in FIG. 4, the camera image capture functionality 414 has been enabled (YES).

The rear panel user interface 400 camera image capture functionality 414 may be further customized to operate the camera device 126 based on a single click, a double-click, a triple click, or a press and hold interaction with the rear input 150. In this regard, the rear panel user interface 400 may include an input section 420 to designate the type of interaction. The input section 420 may be a radio button, a virtual slide switch, or the like. As shown in FIG. 4, the input section 420 has been set for a single click functionality for the rear input 150.

Figure 5:
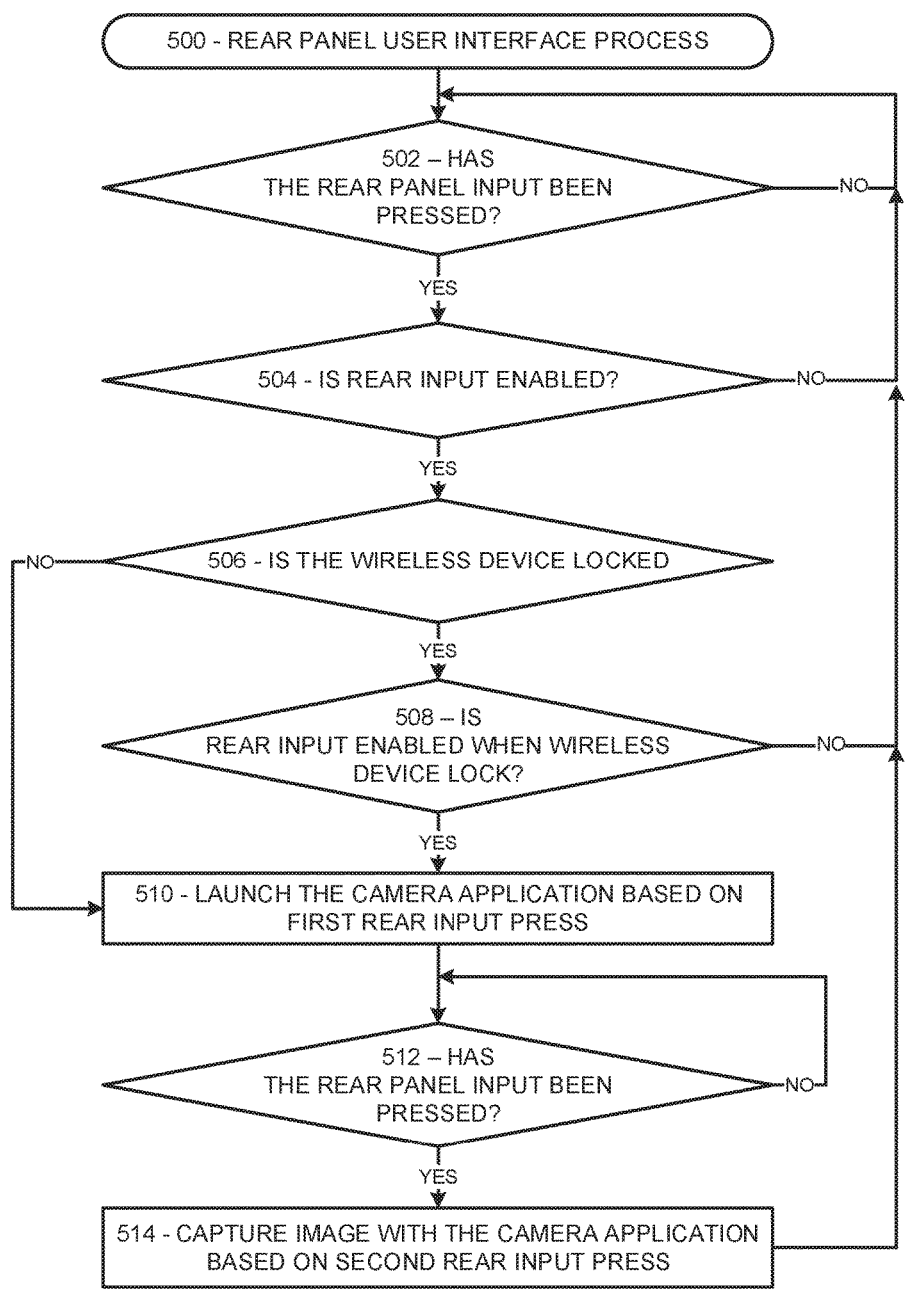
FIG. 5 shows a process of operating the input of the wireless device in accordance with aspects of the disclosure.

FIG. 5 shows a process of operating the input of the wireless device in accordance with aspects of the disclosure. In this regard, FIG. 5 illustrates a rear panel user interface process 500. The rear panel user interface process 500 may be implemented as part of the operating system 148, as part of the rear input control application 152, or the like.

In box 502, the rear panel user interface process 500 may determine whether the rear input 150 has been pressed. In this regard, pressing the rear input 150 may include one or more of a single click, a double-click, a triple click, or a press and hold type of interaction for the rear input 150. If no, then the process will simply loop and wait to be interrupted by receiving input from the rear input 150. If yes, the process will move forward to box 504.

In box 504, the rear panel user interface process 500 may determine whether the rear input 150 is enabled. If no, then the process will simply loop. If yes, the process will move forward to box 506.

In box 506, the rear panel user interface process 500 may determine whether the wireless device is locked. If no, then the process will advance to box 510. If yes, the process will move forward to box 508.

In box 508, the rear panel user interface process 500 may determine whether the rear input 150 is enabled when the wireless device 104 is locked. If no, then the process will simply loop. If yes, the process will move forward to box 510.

In box 510, the rear panel user interface process 500 may launch an application associated with the camera device 126 or simply enable the camera device 126. In other aspects, the rear panel user interface process 500 may launch another type of application as defined by the user or preset in the wireless device 104.

In box 512, the rear panel user interface process 500 may determine whether the rear input 150 has been pressed. In this regard, pressing the rear input 150 may include one or more of a single click, a double-click, a triple click, or a press and hold type of interaction with the rear input 150. If no, then the process will simply loop and wait to be interrupted by receiving input from the rear input 150. If yes, the process will move forward to box 514.

In box 514, the camera device 126 may capture an image provided thereto and store the image in memory 116. In other aspects, the rear panel user interface process 500 may execute another action associated with another type of application as defined by the user or preset in the wireless device 104.

Figure 6:
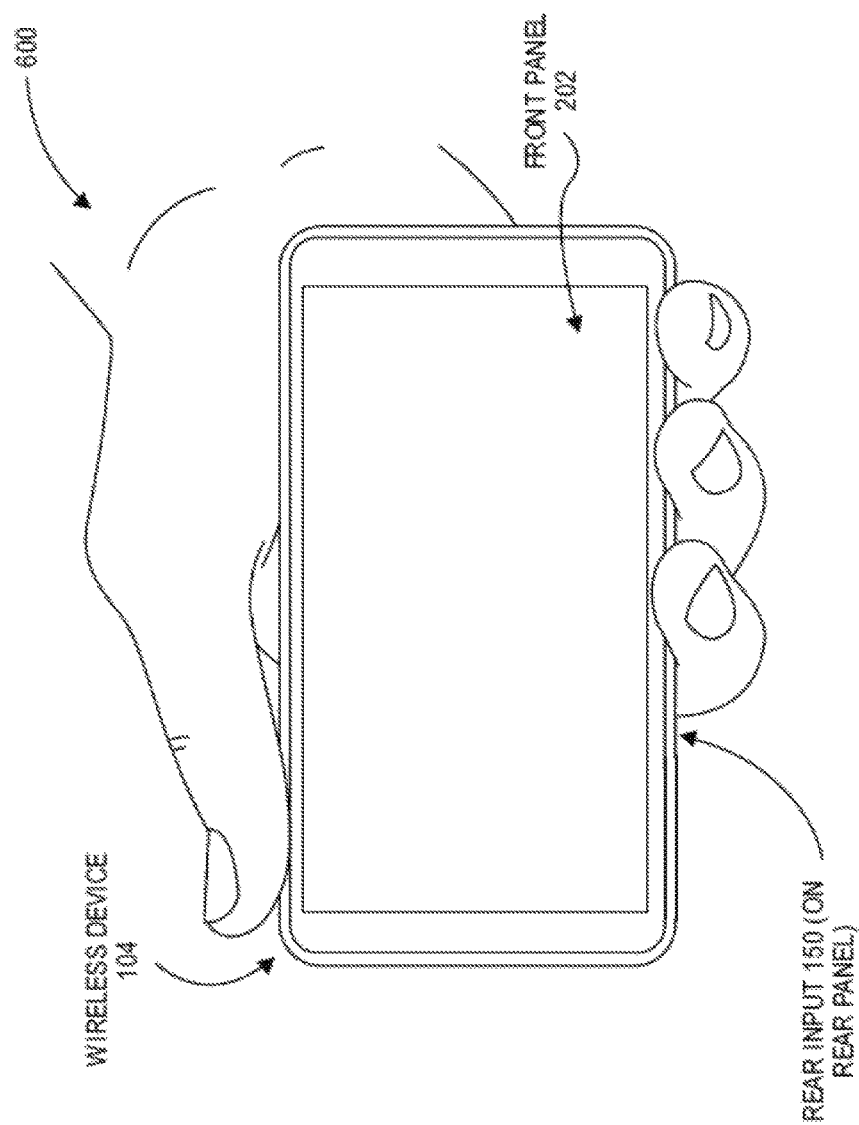
FIG. 6 shows an example of a user interacting with the wireless device in accordance with aspects of the disclosure.

FIG. 6 shows an example of a user interacting with the wireless device in accordance with aspects of the disclosure. In particular, FIG. 6 shows a user's hand 600 holding the wireless device 104 with their hand positioned on the rear panel 302 (not shown) such that at least one finger of the user's hand 600 can operate easily the rear input 150. In this regard, the user may very easily interact with the rear input 150 in order to operate the wireless device 104 in a desired manner. For example, the user may desire to take an image of themselves ("Selfie") and holding the wireless device 104 as shown in FIG. 6 may aim the camera device 126 of the wireless device 104 towards the user and the user can easily launch the camera application and capture an image with a single hand and in a manner that is ergonomically easier than interacting with the front panel 202 as required by prior art devices.

Figure 7:
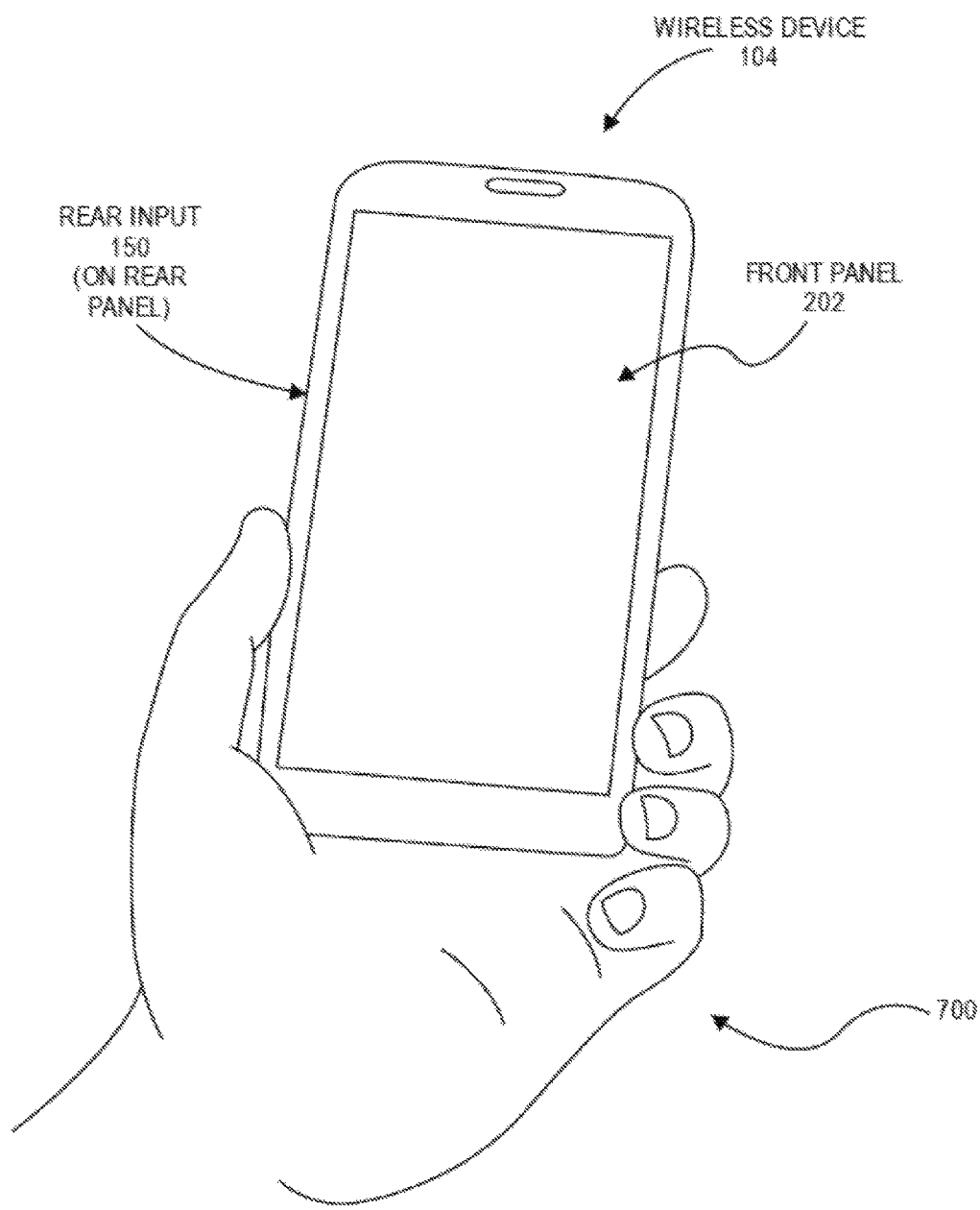
FIG. 7 shows another example of a user interacting with the wireless device in accordance with aspects of the disclosure.

FIG. 7 shows another example of a user interacting with the wireless device in accordance with aspects of the disclosure. Similar to FIG. 6, FIG. 7 shows a user's hand 700 holding the wireless device 104 with their hand positioned on the rear panel 302 (not shown) such that at least one finger of the user's hand 700 can easily actuate the rear input 150. In this regard, the user may very easily interact with the rear input 150 in order to operate the wireless device 104 in a desired manner. For example, the user may desire to take an image of themselves ("Selfie") and holding the wireless device 104 as shown in FIG. 7 may aim the camera device 126 of the wireless device 104 towards the user and the user can easily launch the camera application and capture an image with a single hand and in a manner that is ergonomically easier than interacting with the front panel 202 as required by prior art devices.

Accordingly, the disclosure has presented a wireless device and process that provides a user with the ability to provide easier input, execution and other interaction with the wireless device by a user while the user is holding the wireless device with one hand. Moreover, the disclosure has presented a wireless device and process that provides a user with the ability to provide easier input, execution and other interaction with the wireless device by a user while the user is holding the wireless device in a more ergonomic manner. Finally, the disclosure has presented a wireless device and process that provides a user with the ability to provide easier input, execution and other interaction with the wireless device by a user while the user is holding the wireless device in less secure manner due to the arrangement of the rear input in comparison to a front panel input that requires the user to more securely hold the wireless device with their fingertips while operating the front panel.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. An electronic device comprising:
    a housing including a front panel and a rear panel, the rear panel arranged on a side of the housing opposite the front panel, the housing further including side edges connecting the rear panel to the front panel;
    a processor configured to execute instructions and the processor being arranged within the housing;
    a display device configured to generate an interface based in part in response to the processor, wherein the display device is arranged in the front panel;
    a touchscreen associated with the display device and configured to sense a user input, wherein the user input is provided to the processor and wherein the touchscreen comprises part of the front panel;
    a rear input arranged on the rear panel of the housing and configured to provide a dedicated input to the processor;
    the processor further configured to generate on the interface of the display a selectable listing of different types of interaction with the rear input, the different types of interaction comprising a single click user actuation, a double-click user actuation, a triple click user actuation, and a press and hold user actuation;
    the processor further configured to receive a selection as a user input from a user through the interface of the display of one of the different types of interaction with the rear input; and
    the processor further configured to operate in response to the selected type of interaction based on the selection from the user through the interface of the one of the different types of interaction with the rear input.

2. The electronic device according to claim 1 further comprising:
    an audio input/output device configured to be responsive to the processor;
    the processor being configured to be responsive to receiving an input from the rear input to launch a music application configured to provide music through the audio input/output device,
    wherein the rear input comprises a button arranged on the rear panel.

3. The electronic device according to claim 1
    wherein the rear input comprises a button arranged on the rear panel in a position to be actuated by a user when the user is holding the housing in their hand with the front panel facing the user,
    wherein the side edges comprise a top edge, a bottom edge, and two lateral side edges; and
    wherein the button is arranged on the rear panel closer to one of the two lateral side edges than another one of the two lateral side edges.

4. The electronic device according to claim 1 further comprising a camera device configured to be responsive to the processor, based on receiving an input from the rear input, to at least one of the following: launch a camera application and capture an image.

5. The electronic device according to claim 1 further comprising a camera device configured to be responsive to the processor, based on receiving an input from the rear input, to capture an image,
    wherein the rear input comprises a touch sensitive area.

6. The electronic device according to claim 1 further comprising a camera device configured to be responsive to the processor, based on receiving an input from the rear input, to capture an image,
   wherein the input from the rear input comprises at least one of the following: a single click user actuation, a double-click user actuation, a triple click user actuation, and a press and hold user actuation.

7. The electronic device according to claim 1 wherein the processor is further configured to receive a user input to modify an operation of the processor in response to receiving an input from the rear input,
   wherein the operation comprises at least one of the following: enablement of the rear input, enablement of the rear input when the electronic device is locked, launching a camera application in response to the rear input, and capturing an image in response to the rear input.

8. The electronic device according to claim 1 further comprising a camera device responsive to the processor, based on receiving an input from the rear input, to capture an image,
   wherein the input from the rear input comprises at least one of the following: a single click user actuation, a double-click user actuation, a triple click user actuation, and a press and hold user actuation;
   wherein the processor is further configured to receive a user input to modify an operation of the processor in response to receiving an input from the rear input;
   wherein the operation comprises at least one of the following: enablement of the rear input, enablement of the rear input when the electronic device is locked, launching a camera application in response to the rear input, and capturing an image in response to the rear input;
   wherein the rear input comprises a button arranged on the rear panel in a position to be actuated by the user when the user is holding the housing in their hand with the front panel facing the user.

9. The electronic device according to claim 1 wherein the electronic device comprises at least one of a wireless phone, a mobile phone, user equipment, a tablet computer, and a smartphone; and
   wherein the electronic device further comprises a transceiver configured to connect to a wireless network over a communication channel.

10. The electronic device according to claim 1 further comprising a camera device responsive to the processor, based on receiving an input from the rear input, to capture an image,
   wherein the input from the rear input comprises at least one of the following: a single click user actuation, a double-click user actuation, a triple click user actuation, and a press and hold user actuation;
   wherein the electronic device comprises at least one of a wireless phone, a mobile phone, user equipment, a tablet computer, and a smartphone;
   wherein the electronic device further comprises a transceiver configured to connect to a wireless network over a communication channel;
   wherein the processor is further configured to receive a user input to modify an operation of the processor in response to receiving an input from the rear input;
   wherein the operation comprises at least one of the following: enablement of the rear input, enablement of the rear input when the electronic device is locked, launching a camera application in response to the rear input, and capturing an image in response to the rear input; and
   wherein the rear input comprises a button arranged on the rear panel in a position to be actuated by the user when the user is holding the housing in their hand with the front panel facing the user.

11. A process of implementing an electronic device comprising:
   providing a housing including a front panel and a rear panel, the rear panel arranged on a side of the housing opposite the front panel, the housing further including side edges connecting the rear panel to the front panel;
   arranging a processor within the housing, the processor configured to execute instructions;
   arranging a display device in the front panel, the display device configured to generate an interface based in part in response to the processor;
   arranging a touchscreen as part of the front panel, the touchscreen associated with the display device and configured to sense a user input, wherein the user input is provided to the processor;
   arranging a rear input on the rear panel of the housing, the rear input configured to provide a dedicated input to the processor;
   generating on the interface of the display, in response to the processor, a selectable listing of different types of interaction with the rear input, the different types of interaction comprising a single click user actuation, a double-click user actuation, a triple click user actuation, and a press and hold user actuation;
   receiving a selection as a user input from a user through the interface of the display of one of the different types of interaction with the rear input; and
   operating the processor in response to the selected type of interaction based on the selection from the user through the interface of the one of the different types of interaction with the rear input.

12. The process according to claim 11 further comprising:
   implementing an audio input/output device configured to be responsive to the processor;
   implementing the processor to be responsive to receiving an input from the rear input to launch a music application configured to provide music through the audio input/output device,
   wherein the rear input comprises a button arranged on the rear panel.

13. The process according to claim 11
   wherein the rear input comprises a button arranged on the rear panel in a position to be actuated by a user when the user is holding the housing in their hand with the front panel facing the user;
   wherein the side edges comprise a top edge, a bottom edge, and two lateral side edges; and
   wherein the button is arranged on the rear panel closer to one of the two lateral side edges than another one of the two lateral side edges.

14. The process according to claim 11 further comprising arranging a camera device in the housing, the camera device responsive to the processor based on receiving an input from the rear input to at least one of the following: launch a camera application and capture an image.

15. The process according to claim 11 further comprising arranging a camera device in the housing responsive to the processor, based on receiving an input from the rear input, to capture an image,
   wherein the rear input comprises a touch sensitive area.

16. The process according to claim 11 further comprising arranging a camera device in the housing, the camera device being configured to be responsive to the processor, based on receiving an input from the rear input, to capture an image,
 wherein the input from the rear input comprises at least one of the following: a single click user actuation, a double-click user actuation, a triple click user actuation, and a press and hold user actuation.

17. The process according to claim 11 further comprising receiving a user input to modify an operation of the processor in response to receiving an input from the rear input,
 wherein the operation comprises at least one of the following: enablement of the rear input, enablement of the rear input when the electronic device is locked, launching a camera application in response to the rear input, and capturing an image in response to the rear input.

18. The process according to claim 11 further comprising arranging a camera device within the housing, the camera device configured to be responsive to the processor, based on receiving an input from the rear input, to capture an image,
 wherein the input from the rear input comprises at least one of the following: a single click user actuation, a double-click user actuation, a triple click user actuation, and a press and hold user actuation;
 wherein the processor is further configured to receive a user input to modify an operation of the processor in response to receiving an input from the rear input;
 wherein the operation comprises at least one of the following: enablement of the rear input, enablement of the rear input when the electronic device is locked, launching a camera application in response to the rear input, and capturing an image in response to the rear input; and
 wherein the rear input comprises a button arranged on the rear panel in a position to be actuated by the user when the user is holding the housing in their hand with the front panel facing the user.

19. The process according to claim 11 wherein the electronic device comprises at least one of a wireless phone, a mobile phone, user equipment, a tablet computer, and a smartphone; and
 wherein the electronic device further comprises a transceiver configured to connect to a wireless network over a communication channel.

20. The process according to claim 11 further comprising arranging a camera device within the housing, the camera device configured to be responsive to the processor, based on receiving an input from the rear input, to capture an image,
 wherein the input from the rear input comprises at least one of the following: a single click user actuation, a double-click user actuation, a triple click user actuation, and a press and hold user actuation;
 wherein the electronic device comprises at least one of a wireless phone, a mobile phone, user equipment, a tablet computer, and a smartphone;
 wherein the electronic device further comprises a transceiver configured to connect to a wireless network over a communication channel;
 wherein the processor is further configured to receive a user input to modify an operation of the processor in response to receiving an input from the rear input;
 wherein the operation comprises at least one of the following: enablement of the rear input, enablement of the rear input when the electronic device is locked, launching a camera application in response to the rear input, and capturing an image in response to the rear input; and
 wherein the rear input comprises a button arranged on the rear panel in a position to be actuated by the user when the user is holding the housing in their hand with the front panel facing the user.

* * * * *